No. 624,985. Patented May 16, 1899.
W. D. SCOTT-MONCRIEFF.
APPARATUS FOR PURIFYING SEWAGE.
(Application filed Mar. 8, 1898.)
(No Model.)

WITNESSES:
Fred White
Thomas F. Wallace

INVENTOR
William Dundas Scott-Moncrieff,
By his Attorneys:

UNITED STATES PATENT OFFICE.

WILLIAM DUNDAS SCOTT-MONCRIEFF, OF LONDON, ENGLAND.

APPARATUS FOR PURIFYING SEWAGE.

SPECIFICATION forming part of Letters Patent No. 624,985, dated May 16, 1899.

Application filed March 8, 1898. Serial No. 673,066. (No model.)

*To all whom it may concern:*

Be it known that I, WILLIAM DUNDAS SCOTT-MONCRIEFF, of London, England, have invented certain new and useful Improvements in the Purification of Sewage and in Apparatus Therefor, of which the following is a specification.

This invention relates to the bacteriological purification of sewage without previous straining and to apparatus therefor; and its chief object is to provide highly-aerobic conditions in the downward filtration of sewage, following upon anaerobic treatment in apparatus in which the organic matters in the sewage are more or less broken up and thrown into solution. With this object the sewage, more or less broken up, partly by the action of anaerobic organisms in the first apparatus, is caused to pass downward through a series of separate filters placed one above another, with a clear air-space between them, so that it will drip from filter to filter and as it drips will be subjected to the action of the oxygen of the air, final mineralization of the organic matter through the medium of the organisms which act under these favorable aerobic conditions being thereby attained.

The invention comprises the apparatus for carrying out the above purpose, consisting, essentially, of a series of superimposed filters with clear air-spaces between them, in combination with apparatus for effecting the previous treatment of the sewage anaerobically.

Figure 1:
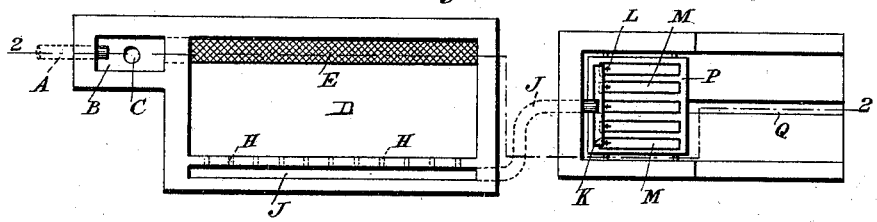
Figure 2:
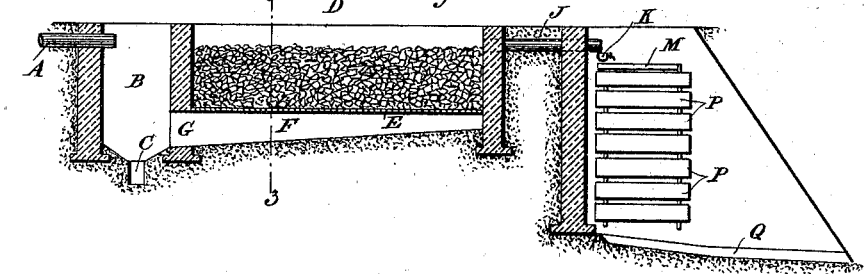
Figure 3:
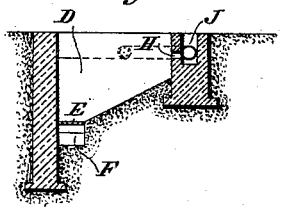
Figure 4:
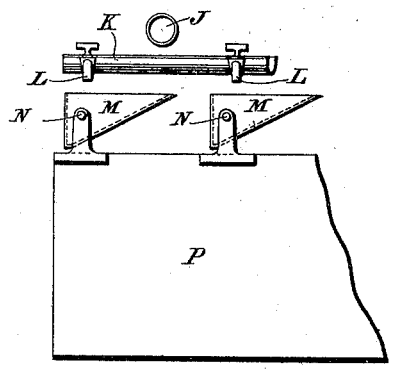

In the accompanying drawings, Figure 1 is a plan of an apparatus constructed according to my invention. Fig. 2 is a section on the irregular lines 2 2 2 2 of Fig. 1. Fig. 3 is a section on the line 3 3 of Fig. 2; and Fig. 4 is a fractional end view, on a larger scale, illustrating the automatically-tipping troughs which supply the sewage to the uppermost filters, as hereinafter described.

Referring to the drawings, let A represent the intake of the crude sewage, and B a chamber into which the sewage is delivered. The bottom of this chamber has a sump C to receive any grit, &c., that may become deposited in this chamber. This grit, &c., may be removed as required in any suitable manner—such, for example, as by opening a penstock or valve or by the use of a chain pump. (Not shown.)

D is a tank adjoining the chamber B. The bottom of this tank has at one part an opening covered by a perforated or foraminous diaphragm E. Below the diaphragm E is a channel F, communicating with the lower part of the chamber B by the opening G. The tank D up to or a little above the overflow-outlets H is filled with materials such as flints, stones, or the like to form a surface to which the bacteria may adhere. The sewage which enters the chamber B passes through the opening G into the channel F and thence through the diaphragm E into the tank D. It rises through the material in the tank and flows out through the overflow-outlets H into the channel J. The crude sewage contains a varying amount of oxygen, which is available for the action of the aerobic organisms—that is to say, organisms which require oxygen—and which are contained in the sewage or deposited on the surface of the filtering material in the tank D. The first stage in the process of purification—that is to say, the breaking up of the organic matters—takes place in the tank D, due chiefly to the action of these aerobic organisms, which first of all use up the available oxygen in the sewage and then attack the oxygen contained in the organic matter itself, the result being that a considerable amount of liquefaction occurs. The next stage of purification or breaking up of the organic matters takes place in the upper part of the tank D, but below the level of the outlets H, after all the oxygen has been consumed, and the anaerobic organisms are therefore favorably situated for carrying on the work of decomposition, and when more especially the complex nitrogenous substances contained in the sewage becomes converted into nitrogen as free ammonia, the cellulose and fatty substances being at the same time subjected to a process which reduces them to simpler compounds. The tank D should not be so shallow as to allow only the aerobic change to occur, because if the depth of the sewage were two shallow it might pass over with some of its available oxygen left. On the other hand, the tank D must not be so deep that the anaerobic changes in it are excessive, because this might unfavorably affect the further aerobic process of nitrification. It is therefore important that unless a separate anaerobic tank be employed the tank D, especially its depth, should be proportioned to the amount of the sewage flowing through it, so as to provide for full advantage being taken of the total available work of both classes of organism, the aerobic and the anaerobic. After this treatment, which throws the organic matter into solution and breaks it up into nitrogen as free ammonia, it is of the greatest importance that the most favorable conditions should be supplied for highly aerobic organisms, and more especially for those whose special function it is to break up free ammonia into nitric nitrogen. This object is attained according to this invention by means of the series of superimposed filters having clear air-spaces between them, and which I will now proceed to describe.

The sewage, more or less broken up, which flows from the tank D by the outlets H into the channel J, as already described, is delivered by said channel, which may be either open or closed, to a channel K, having a series of outlet-nozzles fitted with cocks L, which cocks may, however, be dispensed with. These cocks (or the nozzles without the cocks) deliver the sewage to a series of troughs M M, so mounted on trunnions or centers N N, as will be well understood, that when empty or only partly full they automatically preserve the horizontal position shown in Fig. 4, but when filled up to a given level they are overbalanced, tip on their centers N N, pour out their contents, and then return to the horizontal position. Below the trough M M is a series of superimposed filters P P, with a clear air-space between them. These filters, the uppermost of which receives the sewage intermittently discharged by the troughs M M, are suitable felter-trays. The sewage drips from the uppermost tray to the next below, and then to the next, and so on, and during its passage through the filtering material in the trays and while passing through the clear air-spaces between the trays highly aerobic conditions are established which are greatly favorable to the work of the aerobic organisms, and in this way, by a succession of stages, the sewage becomes purified in a bacteriological sense. From the lowest tray or filter the purified sewage falls into the channel Q, which conducts it to any suitable place of discharge.

What I claim, and desire to secure by Letters Patent, is—

1. The mode of treating sewage bacteriologically, which consists in causing the sewage to pass through an anaerobic apparatus, whereby the organic matters in the sewage become more or less broken up, and then causing it to pass downward through a series of separate superimposed filters having clear air-spaces between them, whereby as the sewage passes through the filters and drips from filter to filter highly aerobic conditions are established which are greatly favorable to the work of the aerobic organisms following after the work of the anaerobic organisms, and the sewage is consequently purified, substantially as set forth.

2. In apparatus for the purification of sewage, the combination of a tank breaking up the organic matter of the sewage by the action of aerobic and anaerobic organisms as it passes through said tank, means for supplying the sewage to said tank, a series of filters placed one above another with clear air-spaces between them, and means for conveying the broken-up sewage from said tank and delivering it to the uppermost of said filters, substantially as and for the purpose set forth.

In witness whereof I have hereunto signed my name in the presence of two subscribing witnesses.

WILLIAM DUNDAS SCOTT-MONCRIEFF.

Witnesses:
ROBERT M. SPEARPOINT,
CHAS. JAS. JONES.